(12) United States Patent
Date et al.

(10) Patent No.: US 10,908,988 B2
(45) Date of Patent: Feb. 2, 2021

(54) STORAGE APPARATUS

(71) Applicant: Hitachi, Ltd., Tokyo (JP)

(72) Inventors: Mitsuo Date, Tokyo (JP); Hideyuki Koseki, Tokyo (JP); Akifumi Suzuki, Tokyo (JP); Masahiro Tsuruya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 133 days.

(21) Appl. No.: 16/327,307

(22) PCT Filed: Apr. 3, 2017

(86) PCT No.: PCT/JP2017/013888
§ 371 (c)(1),
(2) Date: Feb. 21, 2019

(87) PCT Pub. No.: WO2018/185800
PCT Pub. Date: Oct. 11, 2018

(65) Prior Publication Data
US 2019/0213078 A1    Jul. 11, 2019

(51) Int. Cl.
*G06F 11/00* (2006.01)
*G06F 11/10* (2006.01)
*G06F 3/06* (2006.01)

(52) U.S. Cl.
CPC ........ *G06F 11/1012* (2013.01); *G06F 3/0614* (2013.01); *G06F 11/1076* (2013.01)

(58) Field of Classification Search
CPC ............. G06F 11/1402; G06F 11/1405; G06F 11/141; G06F 11/1076; G06F 11/108; G06F 11/1012; G06F 11/1008; G06F 11/1048; G06F 3/0614
See application file for complete search history.

(56) References Cited

U.S. PATENT DOCUMENTS

| | | | | |
|---|---|---|---|---|
| 9,183,085 B1* | 11/2015 | Northcott | ............ | G06F 11/1012 |
| 10,432,233 B1* | 10/2019 | Colgrove | ............ | G06F 11/1012 |
| 2013/0139035 A1 | 5/2013 | Zhong et al. | | |
| 2014/0136927 A1 | 5/2014 | Li et al. | | |
| 2015/0200685 A1* | 7/2015 | Kawano | ................ | G06F 11/108 714/758 |
| 2016/0034354 A1* | 2/2016 | Hashimoto | ........... | G06F 11/108 714/764 |
| 2016/0210186 A1 | 7/2016 | Sato et al. | | |

FOREIGN PATENT DOCUMENTS

JP    2016134167 A    7/2016

* cited by examiner

*Primary Examiner* — Marc Duncan
(74) *Attorney, Agent, or Firm* — Procopio, Cory, Hargreaves & Savitch LLP

(57) ABSTRACT

A storage apparatus includes: a controller; and a plurality of storage drives, wherein the controller issues a read command for specifying a value associated with an error correction mode to a first storage drive of the plurality of storage drives, the first storage drive selects the error correction mode associated with the value specified by the read command from a plurality of error correction modes, the plurality of error correction modes include a first error correction mode and a second error correction mode with a higher correcting capability and a longer maximum delay time than those of the first error correction mode, and the first storage drive executes a read of data from a storage medium in the selected error correction mode.

13 Claims, 20 Drawing Sheets

FIG. 6A

Read Mode CONTROL TABLE — 600

| Read Mode (601) | FMC Read Mode (602) |
|---|---|
| Response Read | A |
| Reliable Read | C |

FIG. 6B

FM Read CONTROL TABLE — 603

| Mode (604) | Max Retry (605) | Decode Mode (606) | sub param (607) | Timeout (608) |
|---|---|---|---|---|
| A | 10 | LDPC Hard | LDPC iter=10 | 150usec |
| B | 20 | LDPC Soft | LDPC iter=20 | 10msec |
| C | 20 | LDPC Hard & Soft | LDPC iter=20 | - |

FIG. 7A

RG STATUS MANAGEMENT TABLE — 700

| RG id (701) | Uncorrectable Count (702) | RG Status (703) |
|---|---|---|
| 0 | 10 | NORMAL |
| 1 | 0 | uncorrectable PROCESSING IN PROGRESS |
| 2 | 0 | RECOVERY OF BROKEN DISK IN PROGRESS |
| 3 | 1 | BREAKDOWN AND uncorrectable |

Read Mode CONTROL TABLE — 900

| Response request | FMC Read Mode |
|---|---|
| 100us | A |
| 500us | A |
| 1ms | C |
| ∞ | C |
| ⋮ | |

FIG. 11A

RESPONSE TIME REQUEST MANAGEMENT TABLE (1100)

| IO Length (1101) | Response Request (1102) |
|---|---|
| 512B | 200usec |
| 4KB | 200usec |
| 8KB | 400usec |
| 64KB | 1msec |
| 256KB | 2msec |

⋮

STORAGE APPARATUS

CROSS-REFERENCE TO RELATED APPLICATIONS

This application is a U.S. National Stage entry of PCT Application No: PCT/JP2017/013888 filed Apr. 3, 2017, the contents of which are incorporated herein by reference.

TECHNICAL FIELD

The present invention relates to a storage apparatus.

BACKGROUND ART

A storage drive using a non-volatile memory as an information storage medium, such as a solid state drive (SSD) using a flash memory (FM) has been widely used. The increase in use of the storage drive using the FM has resulted from a decrease in costs of the FM. The decrease in costs of the FM has been caused by progress in miniaturization and use of a multi-value technology. However, the progress in miniaturization and the use of the multi-value technology tend to deteriorate a quality of the FM.

The FM is a device which deteriorates due to deletion (rewriting), and the deterioration in the quality of the FM causes a decrease in an upper limit value (the number of rewritable times) of the number of times of deletion. In addition, a quality of an FM chip becomes erratic at the time of manufacturing, and there is a case where a difference occurs between deterioration characteristics of FMs with the same number of times of deletion as well.

Meanwhile, the storage drive having the FM has a wear leveling function of performing a leveling of the number of times of deletion, in order to prevent that only some of a plurality of managed physical storage regions deteriorate and the storage drive as a device cannot store information. In addition, in order to correct an error bit (a bit changed from a stored value) occurring in a physical storage region of the FM, the storage drive has a function of assigning an error correcting code (ECC) to recoding data and correcting at the time of reading.

However, in some cases, even when the number of times of deletion is the same, a region in which the error bit can be corrected by using the ECC and a region in which the error bit cannot be corrected are generated due to the erratic quality at the time of manufacturing. In relation to this, PTL 1 discloses a technology in which an ECC scheme with different correcting capabilities is selected based on statistic information such as an error rate or the like in a specific FM block, thereby increasing the number of rewritable times as a device.

PTL 2 discloses using a slow decoding scheme with a high error correcting capability as a method of reading data protected by a low-density parity-check (LDPC) code, when decoding fails at the time of using a fast decoding method with a low error correcting capability.

CITATION LIST

Patent Literature

PTL 1: US 2014-0136927 A
PTL 2: US 2013-0139035 A

SUMMARY OF INVENTION

Technical Problem

PTL 1 and PTL 2 have not considered an increase in unexpected read delay of the storage drive. PTL 1 cannot deal with an increase in unexpected error bits caused by erratic deterioration characteristics of the FM, which is hard to predict. In PTL 2, since the storage drive is operated in a mode in which a read delay for error correction is long, a read response time from the viewpoint of an input/output (I/O) host is increased. Accordingly, a technology capable of controlling the increase in the read response time from the viewpoint of the I/O host and a decrease in reliability as the storage drive when an unexpected error bit of the FM occurs, has been demanded.

Solution to Problem

A representative example of the present invention is a storage apparatus including: a controller; and a plurality of storage drives, wherein the controller issues a read command specifying a value associated with an error correction mode to a first storage drive of the plurality of storage drives, the first storage drive selects the error correction mode associated with the value specified by the read command from a plurality of error correction modes, the plurality of error correction modes include a first error correction mode and a second error correction mode with a higher correcting capability and a longer maximum delay time than those in the first error correction mode, and the first storage drive executes a read of data from a storage medium in the selected error correction mode.

Another representative example of the present invention is a storage drive including: a controller; and a storage medium, wherein the controller receives a read command for specifying a value associated with an error correction mode and selects the error correction mode associated with the value specified by the read command from a plurality of error correction modes, the plurality of error correction modes include a first error correction mode and a second error correction mode with a higher correcting capability and a longer maximum delay time than those in the first error correction mode, and the storage drive executes a read of data from the storage medium in the selected error correction mode.

Advantageous Effects of Invention

According to an embodiment of the present invention, it is possible to improve reliability of the storage drive and suppress an influence of a read delay of the storage drive.

BRIEF DESCRIPTION OF DRAWINGS

FIG. 6A shows an example of a form of data storage managed by a solid state drive (SSD) for switching a processing in response to the read command according to Embodiment 1.

FIG. 6B shows an example of a form of data storage managed by the SSD for switching a processing in response to the read command according to Embodiment 1.

FIG. 7A shows an example of a form of data storage managed by a storage controller for properly and separately using a plurality of read commands according to Embodiment 1.

FIG. 9 shows an example of a management method for switching a control content for read response information according to Embodiment 2.

FIG. 11A shows an example of a form of data storage managed by a storage controller for properly and separately using a plurality of read commands according to Embodiment 2.

DESCRIPTION OF EMBODIMENTS

Figure 1:
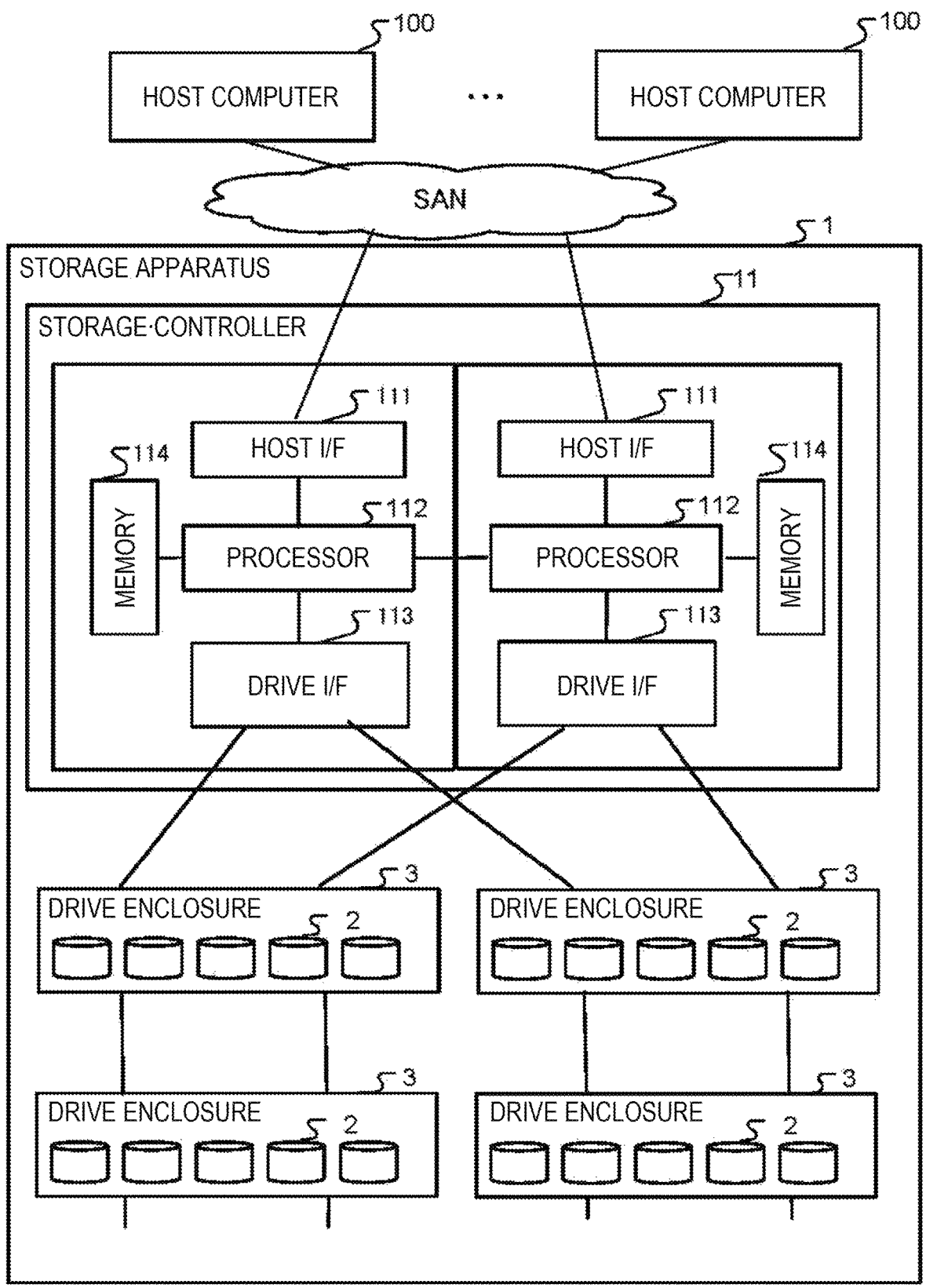
FIG. 1 shows an example of a computer system including a storage apparatus according to Embodiment 1.

Hereinafter, embodiments of the present invention will be described with reference to the accompanying drawings. However, it should be noted that the present embodiment is merely an example for realizing the present invention, and does not limit the technical scope of the present invention. Further, in the respective drawings, the same reference numerals denote common components.

Hereinafter, a description is provided while using a "program" as a subject. However, since the program performs a predetermined processing while using a memory and a communication port (communication control apparatus) by being executed by a central processing unit (CPU), the description may also be provided while using the CPU as a subject.

In addition, a processing disclosed with the program as a subject may also be a processing performed by a computer such as a server computer, a storage controller, a management computer, or the like, or an information processing apparatus. Some or all of programs may be implemented by dedicated hardware, or may be modularized. Various programs may be installed in each computer by a program distribution server or storage media.

In contrast, when a description below is provided while using the processor and the CPU as a subject, respectively, a control program operated based on the description may also be used as a subject. In addition, in the following description, a solid state drive (SSD) using a flash memory (FM) as a representative example of an information storage medium is used as an information storage drive having a non-volatile memory. However, the present invention may be applied to any information storage drive supporting a read command as an input/output (I/O) command interface (I/F).

Embodiment 1

A control method for storage drives according to Embodiment 1 and a storage apparatus including the storage drives will be described with reference to FIGS. 1 to 9. A storage apparatus which performs a storage control for supporting two types of read commands with different error correcting capabilities and different response times from each other, and a control method for properly and separately using the two types of read commands will be described. FIG. 1 shows an example of a computer system including storage drives 2 and a storage apparatus 1.

The computer system mainly includes a host computer 100 which performs data operation, and the storage apparatus 1 which stores data. The storage apparatus 1 includes a drive enclosure 3 in which a plurality of storage drives 2 are mounted, and a storage controller 11 which controls the drive enclosure 3 while communicating with the host computer 100 or another storage apparatus. The storage controller 11 is a higher-level device of the storage drive. The storage drive 2 is, for example, a hard disk drive (HDD) or a solid state drive (SSD).

The number of each of the host computer 100, the storage controller 11, the drive enclosure 3, and the storage drive 2 may be one or plural. Each component to be described below may be configured by dedicated large scale integration (LSI), or may be a processor executing software.

In the present embodiment, physical boundaries among components are not limited. For example, the host computer 100, the storage controller 11, and the storage drive 2 may be mounted in a signal physical enclosure.

The storage controller 11 includes a host interface (hereinafter, referred to as host I/F) 111 which performs communication with the host computer 100, and a drive interface (hereinafter, referred to as drive I/F) 113 which performs communication with the drive enclosure 3. The storage controller 11 includes a processor 112 which controls another component and relays data transmission, and a memory 114 in which data generated by the host computer 100 or various data generated for a control in the storage apparatus are stored. The number of components of the storage controller 11 may be one or plural.

The host I/F 111 converts protocol data used for communication between the host computer 100 and the storage controller 11 into protocol data used internally in the storage controller 11.

Examples of a protocol of the communication with the host computer 100 include Fibre Channel (FC), Fibre Channel over Ethernet (FCoE), and Internet small computer systems interface (SCSI) (iSCSI). An example of an internal protocol includes peripheral component interconnect (PCI)-Express.

The drive I/F 113 converts protocol data used for communication between the storage drive 2 and the storage controller 11 into protocol data used internally in the storage controller 11. Examples of a protocol used for the communication between the storage drive 2 and the storage controller 11 include FC, serial attached SCSI (SAS), and non-volatile memory (NVM) Express (NVMe).

The processor 112 includes a data bus for performing data transmission to the I/Fs 111 and 113 and the memory 114, and an operation circuit for executing software. Instead of the processor 112, another LSI may also be used.

The memory 114 is configured to include a storage element capable of performing high-speed access, such as a dynamic random access memory (DRAM) or the like, and is connected to the processor 112 with a memory interface such as double data rate 3 (DDR3) or DDR4. The memory 114 may also be configured to include a plurality of memory modules. Data used by the I/Fs 111 and 113 and the processor 112 are held on the memory 114.

The storage controller 11 configures redundant arrays of inexpensive disks (RAID) by the plurality of storage drives 2 connected to one another through the drive I/F 113. That is, a storage region of the arbitrary number of storage drives (RAID group) is set as one logical unit (LU), thereby enabling access from the host computer 100.

The storage controller 11 generates parity (redundant data) according to the RAID configuration when receiving a write request for the LU from the host computer 100, and writes the parity in a physical storage drive 2. When receiving a read request for the LU from the host computer 100, the storage controller 11 checks a presence or absence of data loss after reading data from a physical storage drive 2. When the data loss is detected, the storage controller 11 restores data by using RAID parity and transmits the restored data to the host computer 100. By this function, reliability, availability, and I/O performance are improved.

Figure 2:
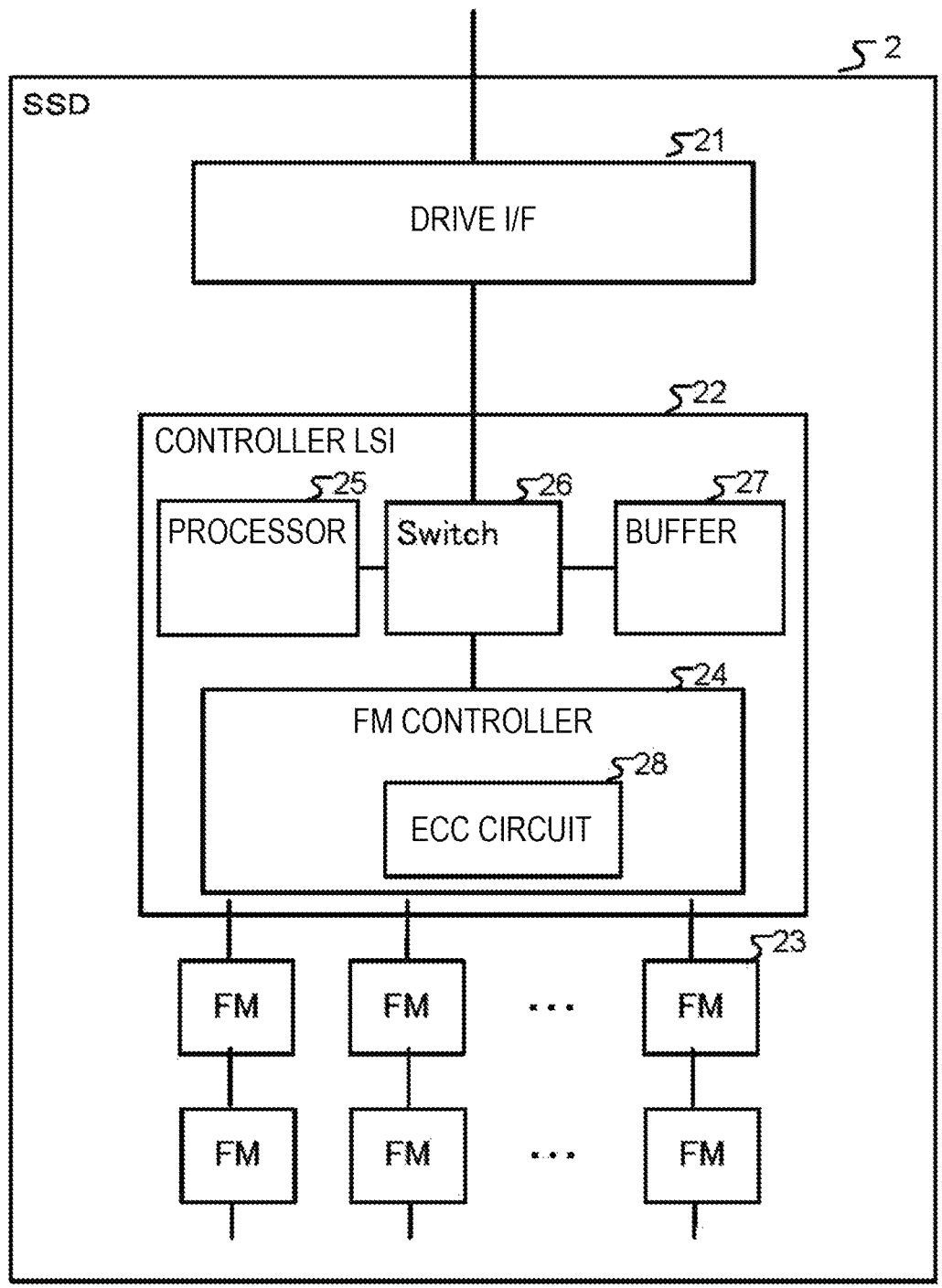
FIG. 2 shows an example of an information storage drive according to Embodiment 1.

FIG. 2 shows a configuration example of an SSD as an example of the storage drive 2. An SSD 2 includes a drive I/F 21, a controller LSI 22, and a flash memory (FM) 23 as a storage medium. The drive I/F 21 interprets an I/O command transmitted by the drive I/F 113 in the storage controller 11. The controller LSI 22 includes a processor 25 which is operated according to a control program, a buffer 27 which temporarily holds data, a switch 26 which connects the processor 25 and the buffer 27 to each other, and a controller 24 which controls the FM 23. The number of each of these components is arbitrary.

Hereinafter, an outline of data transmission in the SSD 2 will be described. The drive I/F 21 receives a read request from the storage controller 11. The drive I/F 21 converts the read request into a form of data capable of being interpreted in the controller LSI 22, stores command information in the buffer 27, and notifies the processor 25 of command reception.

The processor 25 receiving the notification performs read access to the FM 23 through the FM controller 24, reads data to the buffer 27, and notifies the drive I/F 21 that the preparation of data transmission is completed. The drive I/F 21 receiving the notification transmits the data to the storage controller 11.

The drive I/F 21 receives a write request from the storage controller 11. The drive I/F 21 converts the write request into a form of data capable of being interpreted in the controller LSI 22, stores command information in the buffer 27, and notifies the processor 25 of command reception.

The processor 25 receiving the notification secures a region in which write data are to be stored in the buffer 27, and notifies the storage controller 11 through the drive I/Fs 21 and 113 that preparation of data reception is completed. The storage controller 11 receiving the notification stores the write data in the buffer 27 through the drive I/Fs 21 and 113.

When all write data are stored in the buffer 27, the drive I/F notifies the processor 25 of data reception. The processor 25 confirming normal data reception notifies the storage controller 11 that the write data reception is completed, after storing the data in the FM 23 through the FM controller 24. It should be noted that the processor 25 confirming the normal data reception may store the data in the FM 23 after notifying the storage controller 11 that the write data reception is completed.

The FM controller 24 controls data transmission between the FM 23 and the buffer, and performs detection and correction of an error of data by using an error correcting code (ECC) circuit 28 in a process of the data transmission. The ECC circuit may be a dedicated LSI, or may be the processor 25 executing a program or the FM controller 24. The ECC circuit 28 may have an error correcting function with a plurality of modes. The FM controller 24 may include a plurality of LSIs with different error correction modes and properly and separately use the plurality of LSIs.

Figure 3:
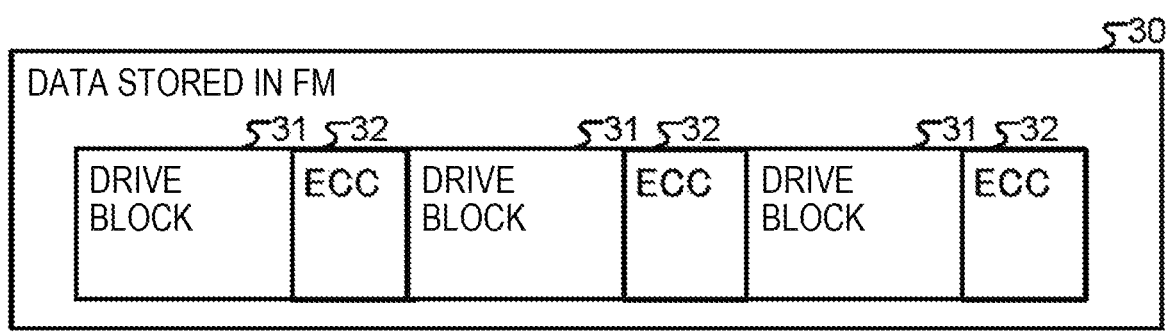
FIG. 3 shows an example of a form of data storage in the information storage drive according to Embodiment 1.

FIG. 3 shows a form of data to which a redundant code is assigned by the ECC circuit 28 and stored in the FM 23. Data 30 stored in the FM 23 include a drive block portion 31 stored in the buffer 27 by the drive I/F 21 and a redundant code portion 32 assigned by the ECC circuit 28.

Figure 4:
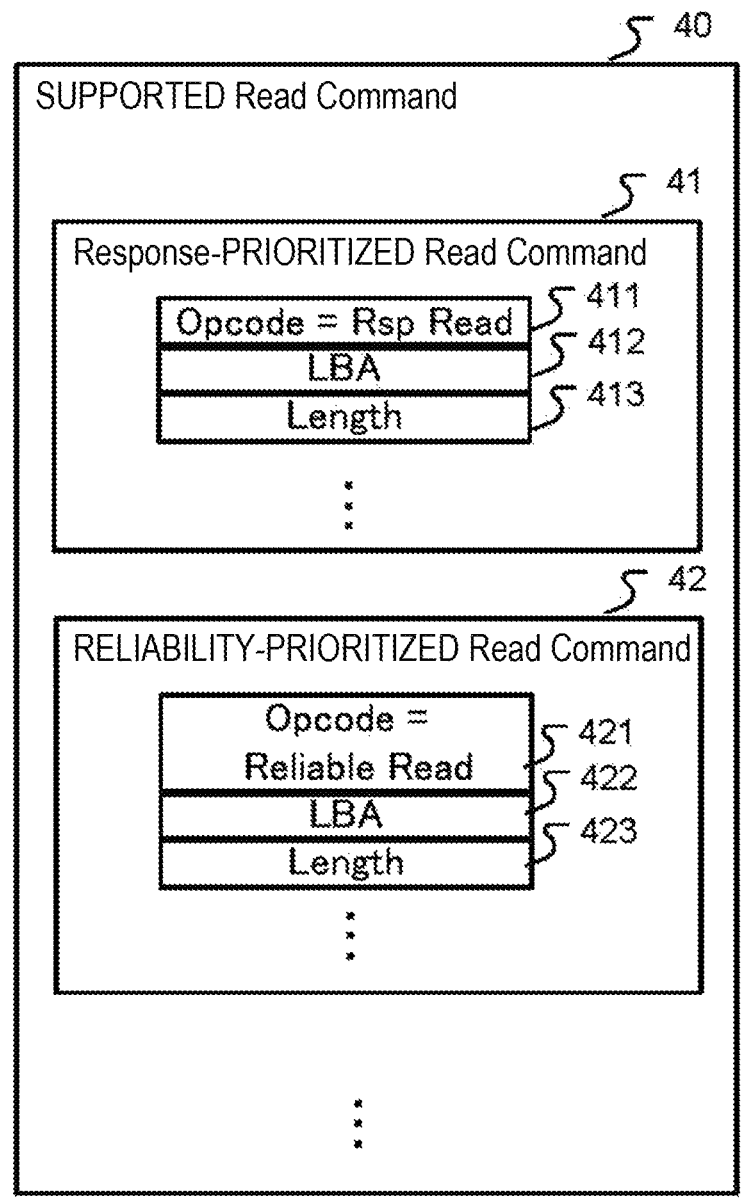
FIG. 4 shows an example of a form of a read command according to Embodiment 1.

FIG. 4 shows a read command supported by the present embodiment. The present embodiment extends an I/O command determined according to an industry standard such as SAS or NVMe. In general, a read command 40 stores information such as an operation code (opcode) 411 for uniquely interpreting a command, a start address (logic block addressing (LBA)) 412 of data desired to be read in the command, a read data length 413, and the like.

The present embodiment supports two types of read commands such as a response-prioritized read command 41 and a reliability-prioritized read command 42, and these are different from a read command determined according to the industry standard, only in regard to the opcode 411.

Figure 5:
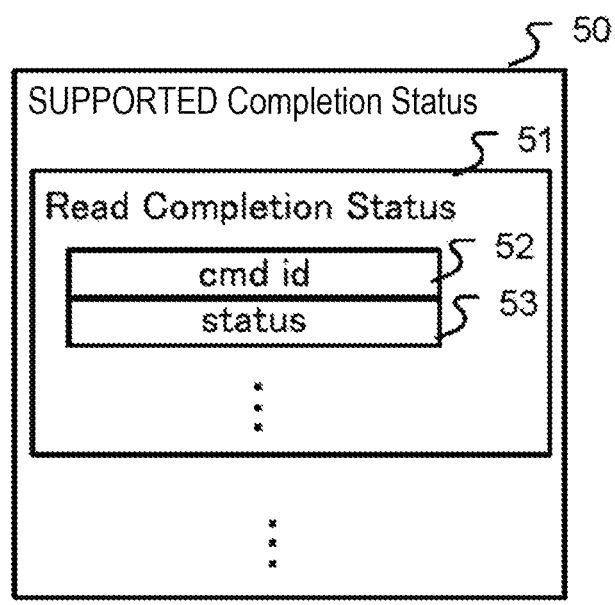
FIG. 5 shows an example of a form of read completion notification according to Embodiment 1.

FIG. 5 shows a completion notification (completion response) for the read command supported by the present embodiment. The present embodiment does not extend a completion notification 50 according to the industry standard such as SAS or NVMe. A read completion notification 51 includes information of an ID 52 for identifying a corresponding relation between the read command 40 which is already issued and the read completion notification 51, and a status 53 for notifying of whether or not the read is normally terminated.

FIGS. 6A and 6B shows information for switching an internal control based on a received command, which is managed by the SSD 2. In detail, FIG. 6A shows a read mode control table 600, and FIG. 6B shows an FM read control table 603. The SSD 2 holds the read mode control table 600 and the FM read control table 603 on a memory inside the buffer 27 or the processor 25.

The read mode control table 600 is referred to in order to switch an internal processing of the processor 25 based on the received read command. The read mode control table 600 manages a corresponding relation between a read mode 601 indicated by the read command and a read mode (FMC read mode) 602 of the FM controller 24. The FMC read mode is an error correction mode.

The FM read control table 603 is referred to in order to switch a read operation mode of the FM controller 24. The FM read control table 603 associates the FMC read mode 604 with a control parameter related to the FMC read mode.

FIG. 6B shows a max retry 605, a decode mode 606, a sub param 607, and a timeout 608 as examples of the control parameter.

The max retry 605 represents the number of times by which the FM read can be repeatedly performed while changing a physical parameter such as a threshold voltage, or the like. The decode mode 606 specifies a decode type of an ECC. The sub param 607 specifies a parameter unique for each decode type of the ECC. The timeout 608 specifies a time limit for giving an uncorrectable error response when the read processing is not completed.

FIG. 6B shows an example in which the LDPC code is used as the ECC. FIG. 6B shows an option of applying a hard decoding algorithm, an option of applying a soft decoding algorithm, and an option of sequentially applying these algorithms as a decode mode by way of example. The soft decoding algorithm has a higher correcting capability and a long processing time than those of the hard decoding algorithm.

The sub param 607 specifies the number of times of iteration of LDPC decoding. Only some of these FMC read control parameters may be specified.

Initial values of the read mode control table 600 and the FM read control table 603 may be determined when the SSD 2 is designed, or may set by the storage controller 11 through a control command. FIG. 6A shows an example in which a read mode A is associated with the response-prioritized read command 41 and a read mode C is associated with the reliability-prioritized read command 42. In the read mode A, an FM read processing is completed for about 150 μsec. In the read mode C, a read completion time is unknown, but the processing is continued to the limit of error correction of the ECC circuit.

Figure 6C:
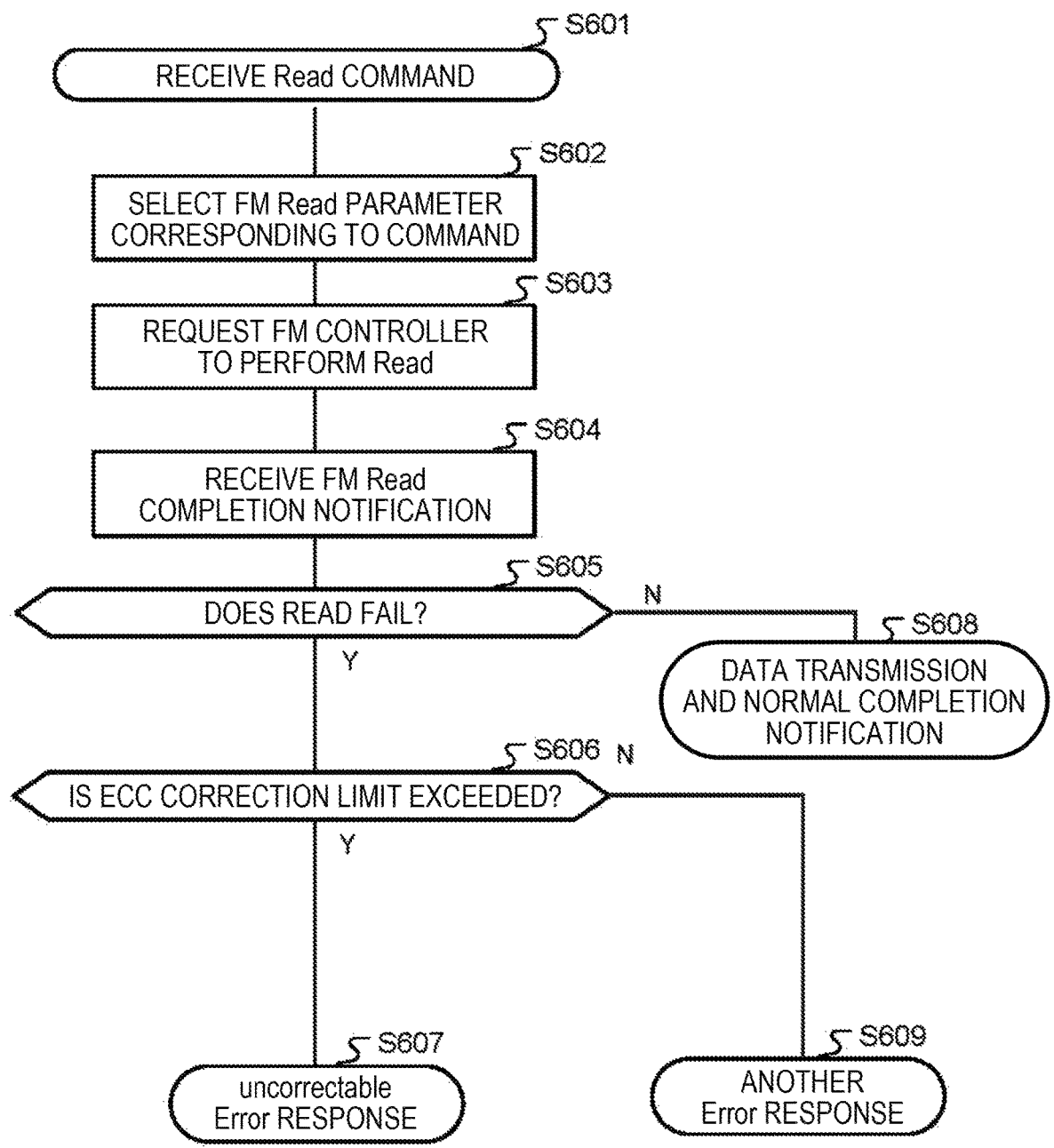
FIG. 6C shows an example of a processing flow of the information storage drive when receiving the read command according to Embodiment 1.

FIG. 6C shows a control flow of the SSD 2 when receiving a read command. When it is detected that a new read command is received (S601), the processor 25 determines an FM read control parameter depending on a read mode (response-prioritized or reliability-prioritized) specified by the opcode 411 of the read command (S602).

In detail, the processor 25 determines an FMC read mode associated with the read mode indicated by the read command by referring to the read mode control table 600. The processor 25 selects a control parameter associated with the determined FMC read mode by referring to the FM read control table 603.

Next, the processor 25 specifies the FM read control parameter to request the FM controller 24 to perform the FM read (S603). Then, the processor 25 receives a read completion notification from the FM controller 24 (S604).

When the FM read succeeds (N in S605), the processor 25 transmits read data to the storage controller 11 and transmits a completion notification 51 for notifying that the data transmission is normally completed (S608). When the FM read fails (Y in S605), the processor 25 confirms a failure factor by referring to a response from the FM controller 24 (S605). In a case other than a case where the factor of the FM read failure is that occurrence of a bit error (uncorrectable error) exceeds an ECC correction limit (N in S606), the processor 25 transmits a completion notification 51 corresponding to an error factor to the storage controller 11 (S609).

In the case where the factor of the FM read failure is that occurrence of a bit error exceeds the ECC correction limit (Y in S606), the processor 25 notifies the storage controller 11 of the uncorrectable error (S607). At this time, the processor 25 may update the read mode control table 600 and the FM read control table 603 according to the number of error bits or the cumulative number of times of error occurrence.

For example, when the number of error bits is large or the cumulative number of error occurrence is large, it is estimated that deterioration of a corresponding region of the FM proceeds (a time for which data can be held becomes short). In consideration of this estimation, it is likely that an uncorrectable error occurs even if the read using the FMC read mode is tried a subsequent time.

Therefore, the processor 25 can improve a success possibility of the read using the response-prioritized read mode by updating the FM read control table 603 so that, for example, the number of max retries of the mode A is increased in proportion to the number of error bits.

FIG. 7A shows an example of a RAID group (RG) status management table 700 managed by the storage controller 11. The RG status management table 700 manages a status of a RAID group. The storage controller 11 holds the RG status management table 700 on the memory 114.

The RG status management table 700 manages the number of times 702 of reception of the uncorrectable error and an operation status (RG status) 703 of the RAID group for each RAID group indicated by a RAID group 701.

An example of the operation status 703 of the RAID group is a status where I/O can be normally performed. Another example thereof is a status where an uncorrectable error is received from the SSD 2 and a processing for the error is in progress. A still another example thereof is a status where an SSD 2 which is broken and thus cannot normally respond to the read command exists in the RAID group, and recovery of data is in progress. A still further another example thereof is a status where an SSD 2 which is broken exists in the RAID group, and an uncorrectable error is received.

Figure 7B:
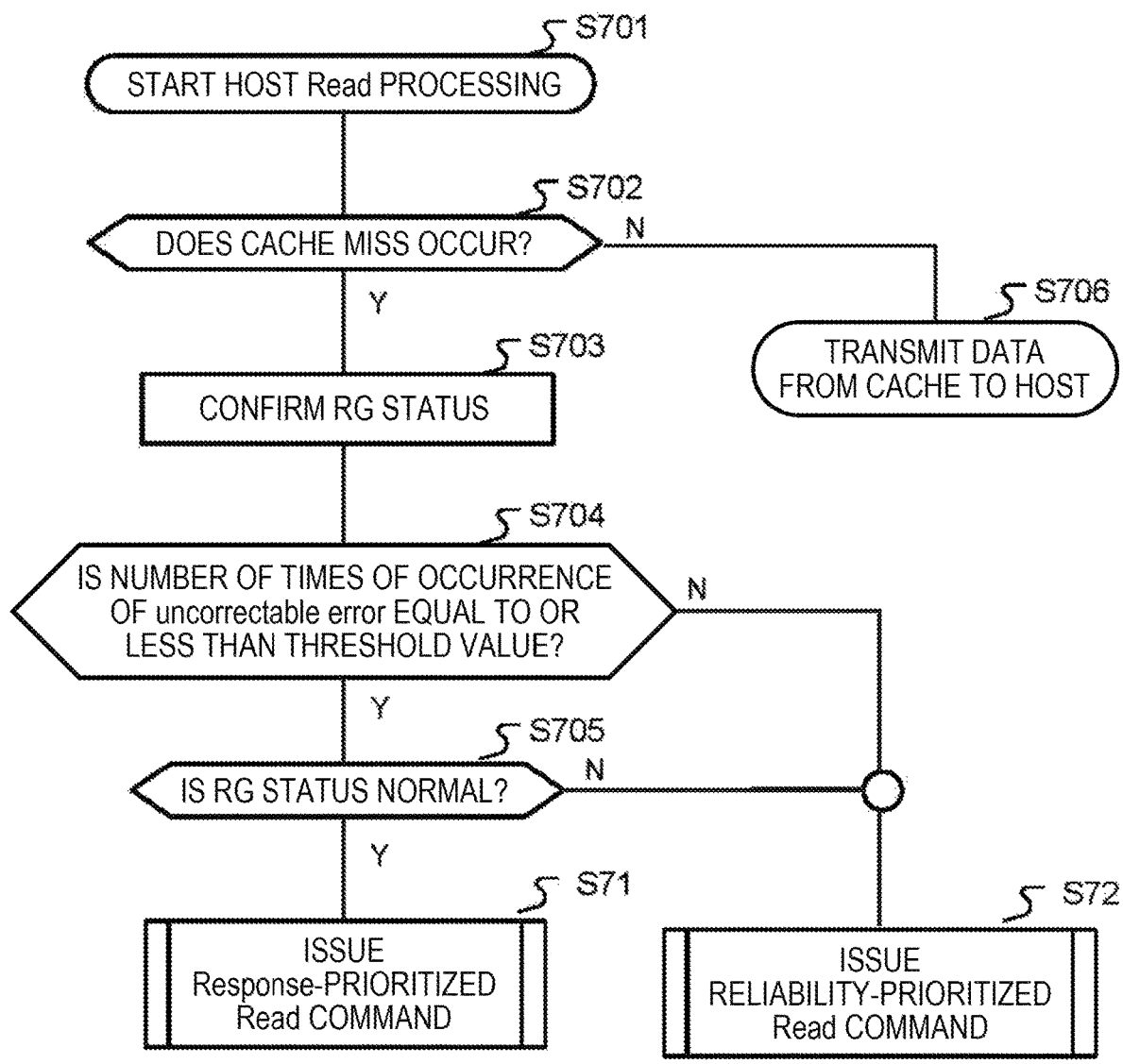
FIG. 7B shows an example of a processing flow of the storage controller when properly and separately using the plurality of read commands according to Embodiment 1.
Figure 7C:
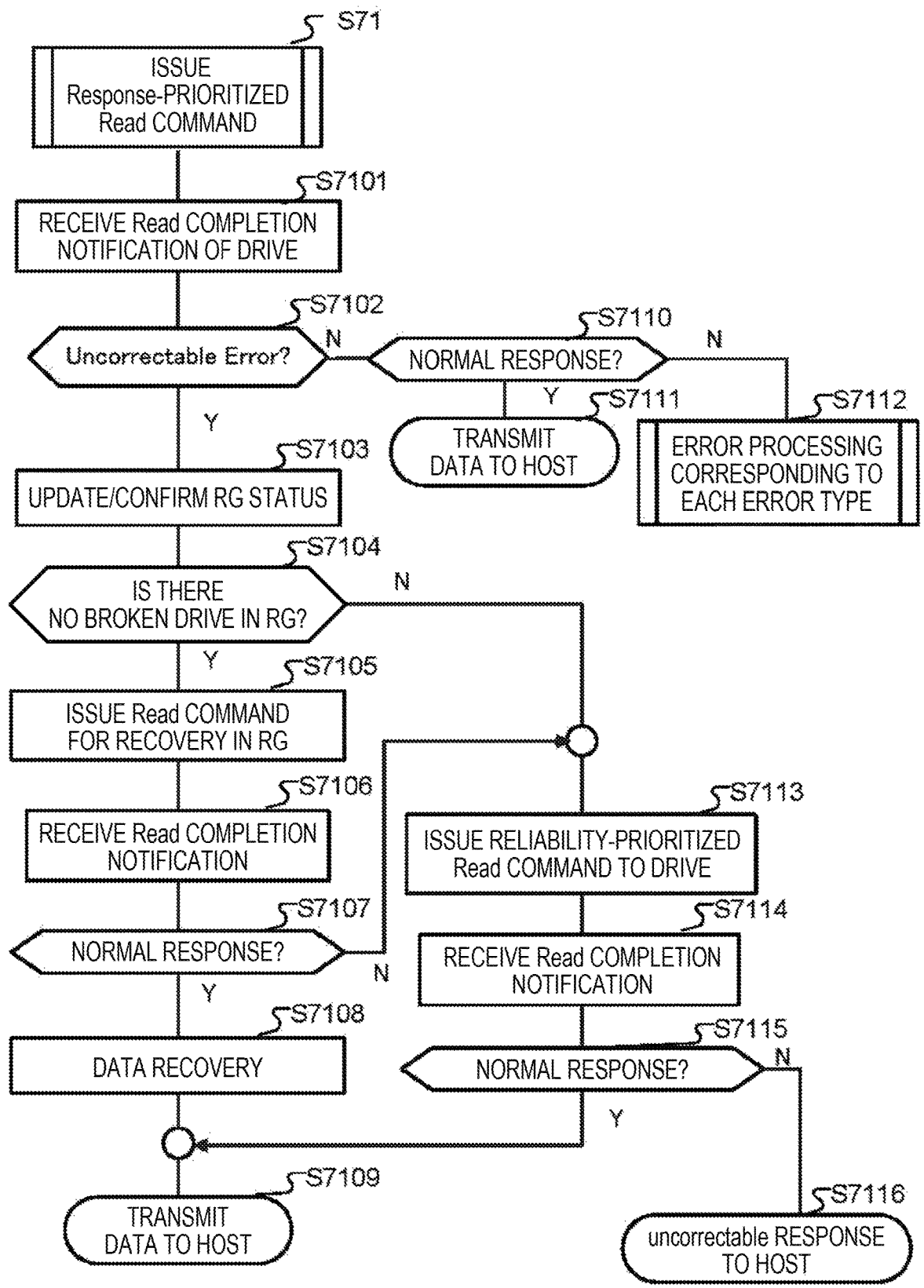
FIG. 7C shows an example of a processing flow of the storage controller when properly and separately using the plurality of read commands according to Embodiment 1.
Figure 7D:
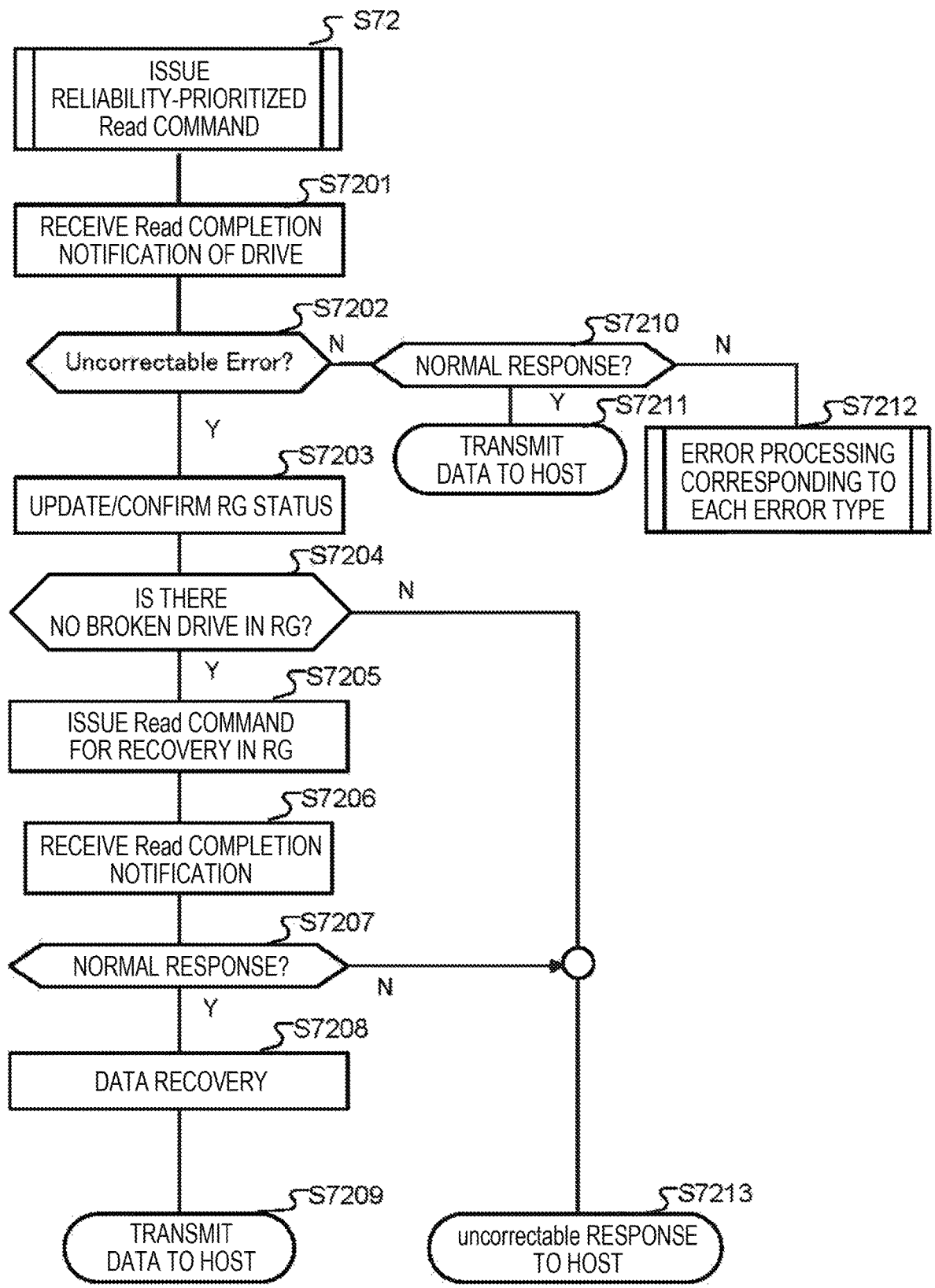
FIG. 7D shows an example of a processing flow of the storage controller when properly and separately using the plurality of read commands according to Embodiment 1.

FIGS. 7B, 7C, and 7D show a control flow of the storage controller 11 using a read command. As shown in FIG. 7B, the storage controller 11 receiving a read request from the host computer 100 starts a host read processing (S701). The storage controller 11 determines whether or not target data are stored in the memory 114 (S702).

When the target data are stored in the memory 114 (Y in S702), the storage controller 11 transmits the data on the memory 114 to the host computer 100 (S706). When the target data are not stored in the memory 114 (N in S702), the storage controller 11 performs preparation for securing a region of the memory 114 in which data read from the SSD 2 are to be temporarily stored, or the like, and confirms a RAID group status to be accessed by referring to the RG status management table 700 (S703).

When the number of times of occurrence of the uncorrectable error of the RAID group is equal to or less than a threshold value (Y in S704) and it can be confirmed that an operation status of the RAID group (all SSDs) is normal (Y in S705), the storage controller 11 issues the response-prioritized read command (S71).

When any one of the conditions is not satisfied (N in S704 or N in S705), the storage controller 11 issues the reliability-prioritized read command (S72). It is likely that the read cannot be normally performed with the response-prioritized read command when any one of the conditions is not satisfied. It is possible to reduce expectations for a delay time by issuing the reliability-prioritized read command.

As shown in FIG. 7C, the storage controller 11 issues the response-prioritized read command (S71) and receives a completion notification 51 from the drive for the response-prioritized read command (S7101). When the completion notification 51 is a normal response (N in S7102 and Y in S7110), the storage controller 11 transmits read data to the host computer 100 (S7111).

When the completion notification 51 is an error response other than the uncorrectable error (N in S7102 and N in S7110), the storage controller 11 performs an error processing corresponding to each error type (S7112).

When the received completion notification 51 is the uncorrectable error (Y in S7102), the storage controller 11 updates the operation status 703 of the RAID group to which a target SSD 2 belongs to an uncorrectable processing in progress, and updates an uncorrectable error count 702 (S7103). After updating the status, the storage controller 11 confirms whether or not another SSD 2 in the corresponding RAID group is broken by referring to the RG status management table 700 (S7104).

When all SSDs 2 constituting the RAID group are not broken (Y in S7104), the response-prioritized read command is issued to another SSD 2 in order to perform data recovery using the RAID parity (S7105). In the present embodiment, a case where a possibility that a plurality of SSDs 2 give uncorrectable error responses for the response-prioritized read command at the same time is sufficiently low is assumed (the number of times of occurrence of the uncorrectable error is equal to or less than a threshold value). Therefore, the response-prioritized read command is used. The storage controller 11 may also use the reliability-prioritized read command.

The storage controller 11 receives a completion notification 51 for the response-prioritized read command (S7106). When all completion notifications 51 for the response-prioritized read command are normal (Y in S7107), the storage controller 11 performs data recovery of the RAID group (S7108), and transmits recovered data to the host computer 100.

When the completion notification 51 for any response-prioritized read command is abnormal (N in S7107), or when another SSD 2 constituting the RAID group is broken (N in S7104), the storage controller 11 issues the reliability-prioritized read command (reissues the read command) to the target SSD 2 to which the response-prioritized read command is first issued (S7113). This is because the data recovery using the RAID parity is not possible.

The storage controller 11 receives a completion notification 51 for the reliability-prioritized read command (S7114). When the completion notification 51 for the reliability-prioritized read command is normal (Y in S7115), the storage controller 11 transmits read data to the host computer 100 (S7109). When the completion notification 51 is an abnormal notification including the uncorrectable error (N in S7115), the storage controller 11 performs a processing corresponding to a content of the error. Basically, the data recovery is not possible. Therefore, the storage controller 11 notifies the host computer 100 of an uncorrectable response (S7116).

As shown in FIG. 7D, the storage controller 11 issues the reliability-prioritized read command (S72) and receives a completion notification 51 from the drive for the reliability-prioritized read command (S7201). When the completion notification 51 is a normal response (N in S7202 and Y in S7210), the storage controller 11 transmits read data to the host computer 100 (S7211). When the completion notification 51 is an error response other than the uncorrectable error (N in S7202 and N in S7210), the storage controller 11 performs an error processing corresponding to each error type (S7212).

When the received completion notification 51 is the uncorrectable error (Y in S7202), the storage controller 11 updates the operation status 703 of the RAID group to which the target SSD 2 belongs to the uncorrectable processing in progress, and updates the uncorrectable error count 702 (S7203). After updating the status, the storage controller 11 confirms whether or not another SSD 2 in the corresponding RAID group is broken by referring to the RG status management table 700 (S7204).

When all SSDs 2 constituting the RAID group are not broken (Y in S7204), the storage controller 11 issues the reliability-prioritized read command to another SSD 2 in order to perform data recovery using the RAID parity (S7205).

The storage controller 11 receives a completion notification 51 for the reliability-prioritized read command (S7206). When all completion notifications 51 for the reliability-prioritized read command are normal (Y in S7207), the storage controller 11 performs data recovery of the RAID group (S7208), and transmits recovered data to the host computer 100 (S7209).

When any one of the completion notifications 51 for the reliability-prioritized read command is abnormal (N in S7207), or when another SSD 2 constituting the RAID group is broken (N in S7204), data recovery using the RAID parity is not possible. Since the read using the reliability-prioritized read command fails, the storage controller 11 transmits an uncorrectable response to the host computer 100 (S7213).

As described above, the SSD 2 of the present embodiment supports two kinds of read commands. The response-prioritized read command 41 does not try the bit error correction up to a correction limit of the ECC function, but instead, guarantees a response delay time. The reliability-prioritized read command 42 does not guarantee a response delay time, but instead, tries the bit error correction to the correction limit of the ECC function.

In addition, the storage controller 11 controlling the SSD 2 normally performs the read by using the response-prioritized read command 41 at the time of I/O. When receiving the uncorrectable error, the storage controller 11 transmits data to the host computer 100 by the data recovery using the parity of the RAID group. When reliability of the SSD 2 is prioritized, for example, when the RAID group is broken, the storage controller 11 performs the read by using the reliability-prioritized read command 42.

In the present embodiment, data transmission to the host computer 100 is possible after data recovery using the parity of the RAID group when an unexpected FM bit error occurs, which is caused by erratic deterioration characteristics of the FM. Accordingly, read response performance with a higher speed can be guaranteed, in comparison to performing the read to the correction limit of the ECC again inside the SSD 2. Further, the present embodiment supports the reliability-prioritized read command 42, thereby making it possible to improve reliability of a single SSD and increase the number of rewritable times.

A maximum delay time of the response-prioritized read command is shorter than a maximum delay time of the reliability-prioritized read command. An error correcting capability of the reliability-prioritized read command is higher than a error correcting capability of the response-prioritized read command. Under this condition, the modes associated with the response-prioritized read command and the reliability-prioritized read command, respectively, may have configurations different from those described above. The storage drive may support different types of read commands from the two types of read commands described above.

Embodiment 2

Figure 8:
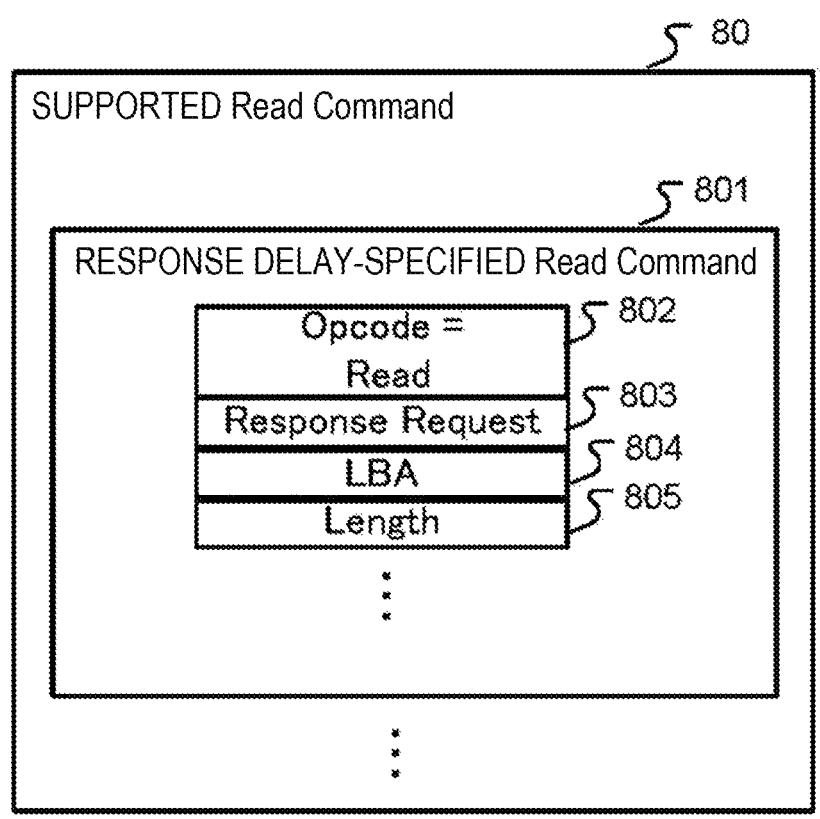
FIG. 8 shows an example of a form of a read command according to Embodiment 2.

Embodiment 2 shows an example in which additional information is stored in a read command, rather than increasing the number of types of read commands supported by an SSD 2 and properly and separately using the read commands. FIG. 8 shows a read command supported in the present embodiment.

The present embodiment extends an I/O command determined according to an industry standard such as SAS or NVMe. In the present embodiment, a response time request value indicating a response time which may be used until a read completion notification is received is assigned to a read command 80. A storage controller 11 stores a time for waiting read processing completion in a response time request value field 803. An SSD 2 receiving the present command performs an internal processing so as to satisfy the set response time request value. The SSD 2 supporting the present command switches an operation mode depending on the response time request value which is set at the time of receiving the command.

FIG. 9 shows a read mode control table 900 managed by the SSD 2 in the present embodiment. The read mode control table 900 manages a relationship between a response time request value 901 and an FMC read mode 902. The SSD 2 holds the read mode control table 900 and an FM read control table 603 on a memory inside a buffer 27 or a processor 25.

The SSD 2 changes an internal processing depending on the response time request value by referring to the read mode control table 900. The SSD 2 selects, for example, a value which is equal to or larger than the response time request value indicated by the read command and is closest to the response time request value indicated by the read command, from the response time request value 901.

A form of data of a completion notification 50 of a read command is the same as that of Embodiment 1. However, in the present embodiment, a notification status code is added to information of a status 53 for notifying whether or not the read is terminated normally, the notification status code indicating that a response time exceeds the response time request value specified by the command.

Figure 10:
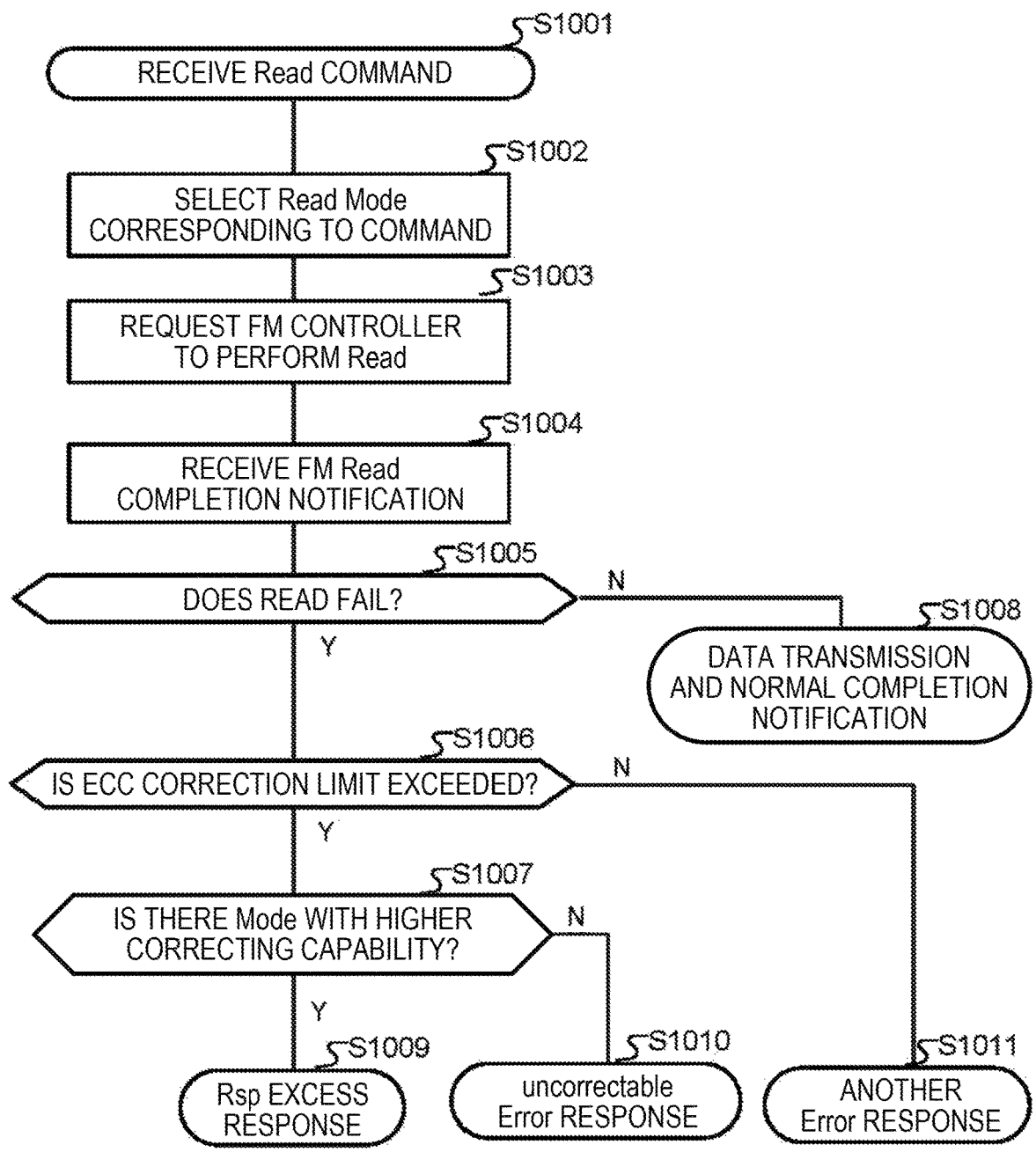
FIG. 10 shows an example of a processing flow of an information storage drive when receiving a read command according to Embodiment 2.

FIG. 10 shows a control flow of the SSD 2 when receiving a read command according to Embodiment 2. The processor 25 detects reception of a new read command (S1001). The processor 25 acquires a response time request value from a response time request value field 803 of the read command. The processor 25 determines an FMC read mode corresponding to the response time request value by referring to the read mode control table 900 and determines a control parameter associated with the FMC read mode by referring to the FM read control table 603 (S1002).

The processor 25 indicates the control parameter to request an FM controller 24 to perform the read from an FM 23 (S1003). The processor 25 measures a read processing time, and may notify the storage controller 11 of an excess of response time request value when a processing of the FM controller 24 does not end within the response time request value.

The processor 25 receives a read completion notification from the FM controller 24 (S1004). When the read succeeds (N in S1005), the processor 25 transmits read data to the storage controller 11 and transmits a completion notification 51 for notifying that the data transmission is normally completed (S1008).

When the FM read fails (Y is S1005), the processor 25 confirms a failure factor by referring to a response from the FM controller 24. In a case other than a case where the factor of the FM read failure is occurrence of a bit error exceeding an ECC correction limit (N in S1006), the processor 25 transmits a completion notification 51 corresponding to an error factor to the storage controller 11 (S1011).

In the case where the factor of the FM read failure is the occurrence of a bit error exceeding the ECC correction limit (Y in S1006) and an FMC read mode with the highest error correcting capability (the mode C in the example of FIG. 6B) is used (N in S1007), the processor 25 notifies the storage controller 11 of the uncorrectable error (S1010).

When the SSD 2 uses an FMC read mode with a high speed in order to satisfy the specified response time request value even though the SSD 2 can exhibit a higher error correcting capability (Y in S1007), the processor 25 notifies the storage controller 11 of a completion notification 51 meaning an excess of response request time (S1009).

FIG. 11A shows a response time request management table 1100 used by the storage controller 11 when using the read command according to Embodiment 2. The storage controller 11 holds the response time request management table 1100 for managing a setting of the response time request value on the memory 114, in addition to an RG status management table 700.

FIG. 11A shows an example in which a response time request value 1102 for a data transmission length 1101 of a read request for the storage drive (SSD) 2 is managed. The response time request value can be appropriately determined according to the data transmission length. The response time request value is set so that, for example, the response time request value is shorter than a data recovery time using a RAID group (parity data) and longer than the fastest read time of the SSD 2.

These values can be calculated by using a read data transmission length, read performance of the SSD 2, and processing performance of the storage controller 11. Numeral values of these values may be set at the time of product shipping. The storage controller 11 may measure an actual read time and an actual data recovery time, and dynamically update the numerical values according to the values.

Figure 11B:
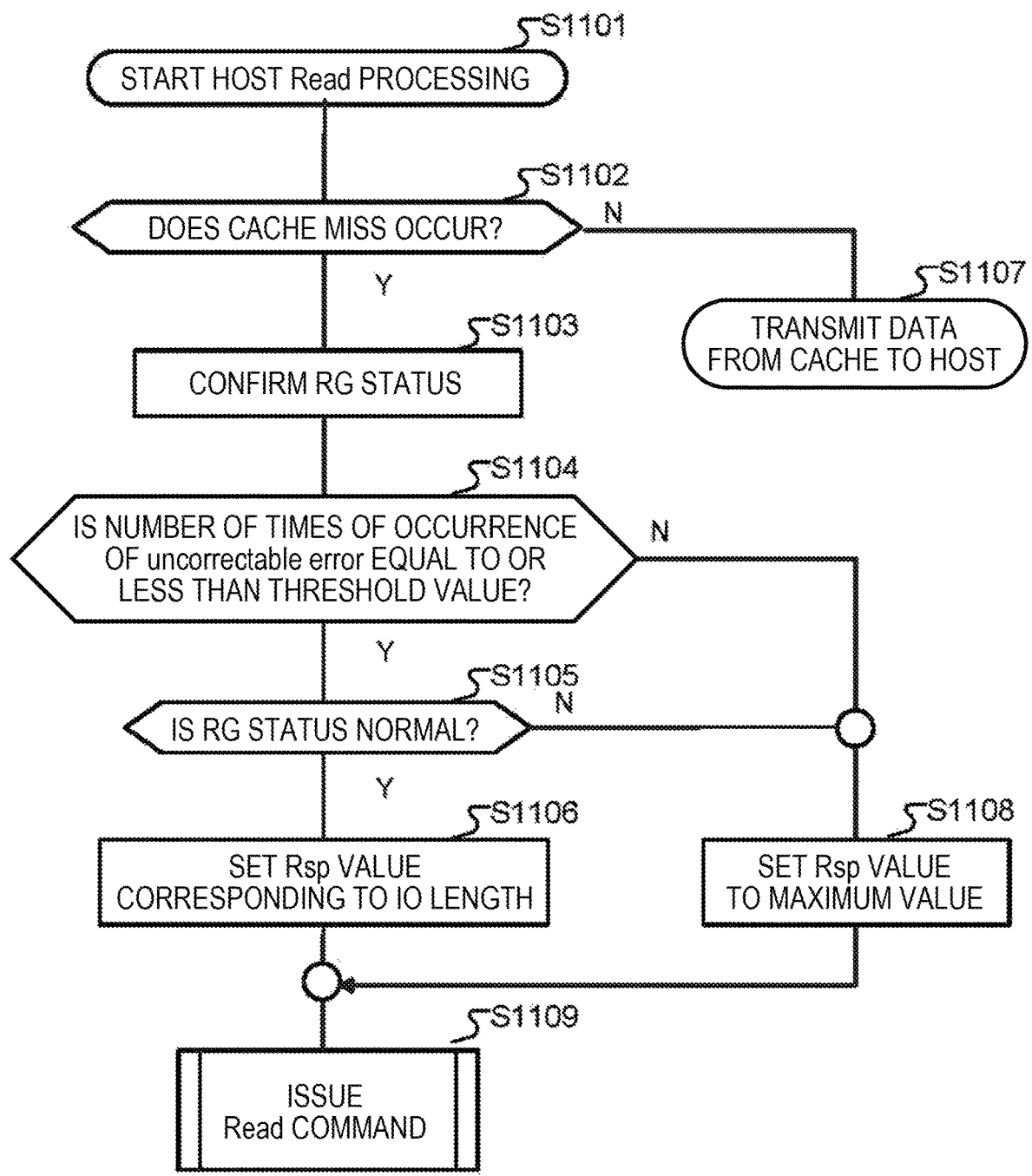
FIG. 11B shows an example of a processing flow of the storage controller when properly and separately using settings of the read command according to Embodiment 2.
Figure 11C:
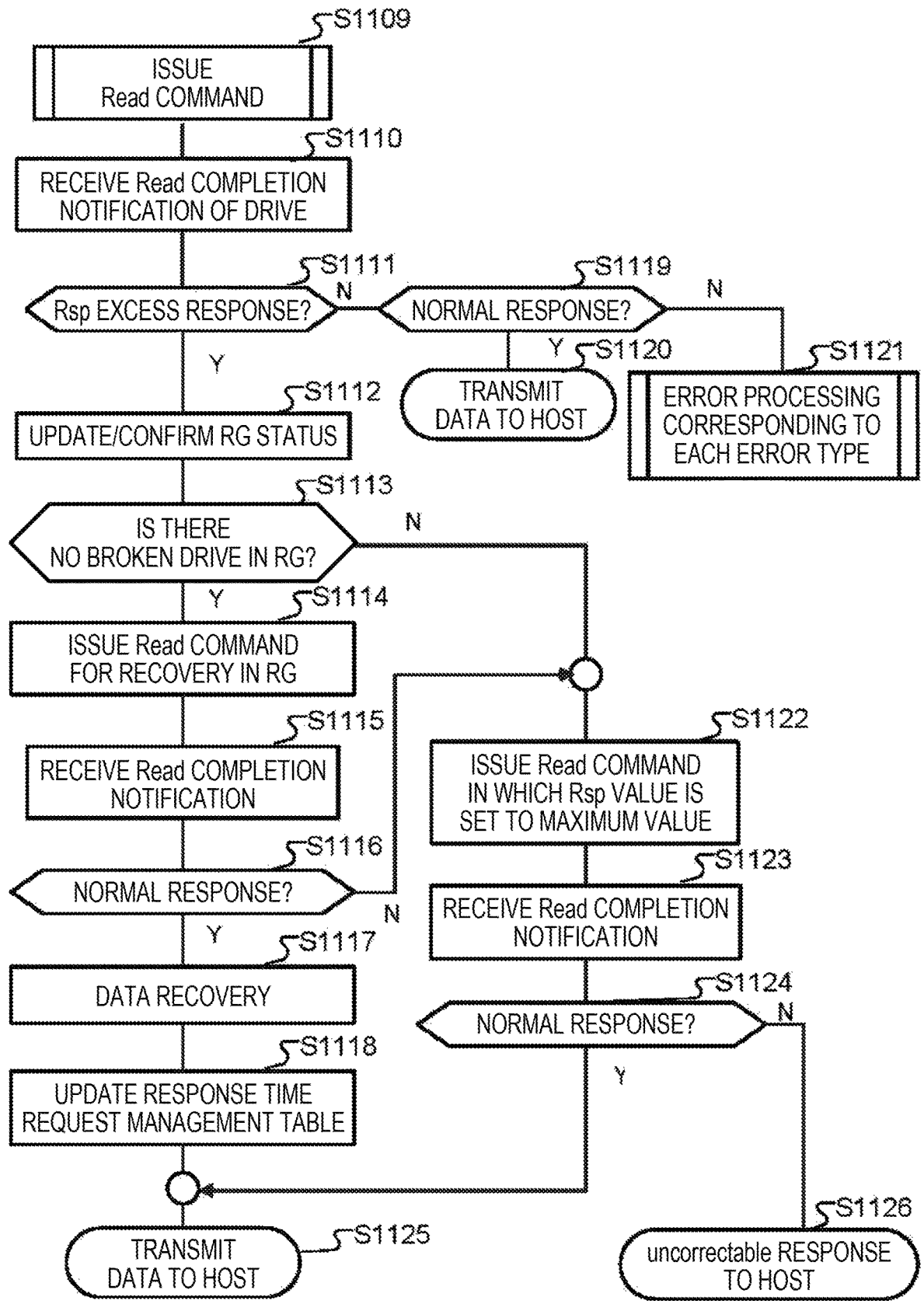
FIG. 11C shows an example of a processing flow of the storage controller when properly and separately using the settings of the read commands according to Embodiment 2.

FIGS. 11B and 11C show a control flow of the storage controller 11 using a read command according to the present embodiment. As shown in FIG. 11B, the storage controller 11 receives a read request from a host computer 100 and starts a host read processing (S1101).

The storage controller 11 determines whether or not target data are stored in the memory 114 (S1102). When the target data are stored in the memory 114 (N in S1102), the storage controller 11 transmits the data on the memory 114 to the host computer 100 (S1107).

When the target data are not stored in the memory 114 (Y in S1102), the storage controller 11 secures a region in which data read from the SSD 2 are to be temporarily stored in the memory 114, and confirms a RAID group status by referring to the RG status management table 700 (S1103).

When the number of times of occurrence of an uncorrectable error of the RAID group is equal to or less than a threshold value (Y in S1104) and an operation status of the RAID group is normal (Y in S1105), the storage controller 11 sets a response time request value in a response time request value field 803 of the read command by using the response time request management table 1100 (S1106).

When any one of the conditions is not satisfied (N in S1104 or N in S1105), the storage controller 11 sets a maximum value which can be set in the response time request value field 803 of the read command as a system (S1108). It is likely that the data cannot be read with the read command having a short response time request value when any one of the conditions is not satisfied. A maximum response time request value is set, thereby reducing expectations for the response delay time.

The storage controller 11 issues a read command in which a response time request value is set (S1109). As shown in FIG. 11C, the storage controller 11 receives a completion notification 51 for the read command from the SSD 2 (S1110). When the completion notification 51 is a normal response (N in S1111 and Y in S1119), the storage controller 11 transmits read data to the host computer 100 (S1120).

When the completion notification 51 is an error response other than the excess of response time request value (N in S1111 and N in S1119), the storage controller 11 performs an error processing corresponding to each error type (S1121).

When the received completion notification 51 is the excess of response time request value (Y in S1111), the storage controller 11 updates an operation status 703 of the RAID group to which the target SSD 2 belongs to the uncorrectable processing in progress, and updates the uncorrectable error count 702 (S1112). After updating the status, the storage controller 11 confirms whether or not another SSD 2 in the corresponding RAID group is broken by referring to the RG status management table 700 (S1113).

When all SSDs 2 constituting the RAID group are not broken (Y in S1113), the storage controller 11 issues a read command in which the same response time request value as that in S1106 is set to another SSD 2 in order to perform data recovery using the RAID parity (S1114). When all completion notifications 51 for the read command are normal (Y in S1116), the storage controller 11 performs data recovery of the RAID group (S1117).

The storage controller 11 may update the response time request management table 1100 by measuring a time required to perform the data recovery processing using the RAID group (S1118). For example, the storage controller 11 measures a recovery time of the data recovery using the RAID group and compares the recovery time with a desired processing time set in the response time request management table 1100. A state where the measured recovery time is significantly longer than the desired time set in the table (for example, by five times) means that the setting value of the table is not appropriate.

This is because it can be estimated that the SSDs constituting the same RAID group have averagely approximately the same read time, and the processing time required for the recovery processing is merely two times the setting value.

A state where the recovery time is significantly longer than the time set in the table is an immoderate state where the setting value in the management table is significantly beyond the average response performance of the SSD, and a possibility that the SSD can give the response within the desired time is low. When the possibility is low, the plural number of times of the read is performed, which causes an increase in an average processing time. In order to correct the problem, the storage controller 11 overwrites, for example, a time corresponding to ½ of the measured recovery time in the request management table. Then, the storage controller 11 transmits the recovered data to the host computer 100 (S1125).

When any one of the completion notifications 51 of the SSD 2 is abnormal or when another SSD 2 constituting the RAID group is broken, data recovery using the RAID parity is not possible. The storage controller 11 reissues a read command in which a maximum value is set in the response time request value field 803 to the SSD 2 to which the read command is first issued (S1109) (S1122).

When the completion notification 51 for the read command in which the maximum value is set in the response time request value field 803 is a normal (Y in S1124), the storage controller 11 transmits read data to the host computer 100 (S1125).

When the completion notification 51 is an abnormal notification including the uncorrectable error (N in S1124), the storage controller 11 performs a processing corresponding to a content of the error. Basically, the data recovery is not possible. Therefore, the storage controller 11 notifies the host computer 100 of an uncorrectable response (S1126).

As described above, in the present embodiment, the SSD 2 supports a read command in which a response time request value can be set. In addition, the storage controller 11 controlling the SSD 2 normally sets the response time request value which is approximately the same as the recovery processing time of the RAID group at the time of I/O. The storage controller 11 performs data recovery using the parity of the RAID group when receiving a response after exceeding a delay time. When reliability of the SSD 2 is prioritized, for example, when the RAID group is broken, the storage controller 11 sets a maximum value in the response time request value field 803.

According to the present embodiment, in addition to the effects of Embodiment 1, it is possible to perform more fine-grained delay design as the storage apparatus by considering a transmission length of read data or basic performance of the SSD. In particular, when a data recovery processing time of the RAID group is short, for example, when a RAID configuration of a RAID 1 (mirroring) is used, a short response time request value is set, thereby further stabilizing a response delay of the storage apparatus.

Embodiment 3

Figure 12:
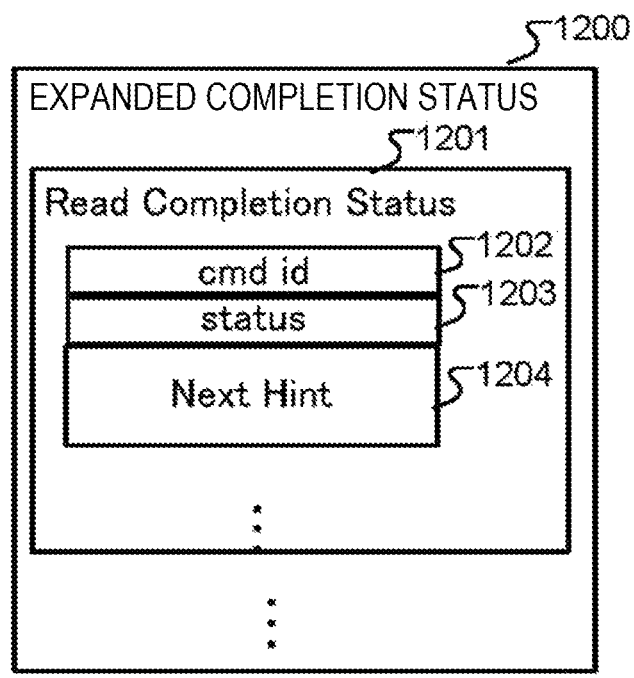
FIG. 12 shows an example of a form of read completion notification according to Embodiment 3.

Embodiment 3 extends a read completion notification (completion response) in addition to changing a read command supported by an SSD. FIG. 12 shows an example of a form of a read completion notification supported by an SSD 2 in the present embodiment.

In Embodiments 1 and 2, a notification of an uncorrectable error or a notification of an excess of specified response delay are made by using only a completion status 1203 of a completion notification 1200. The present embodiment supports a field 1204 in which a hint of a delay time required when the read to the same LBA is performed next time.

Figure 13:
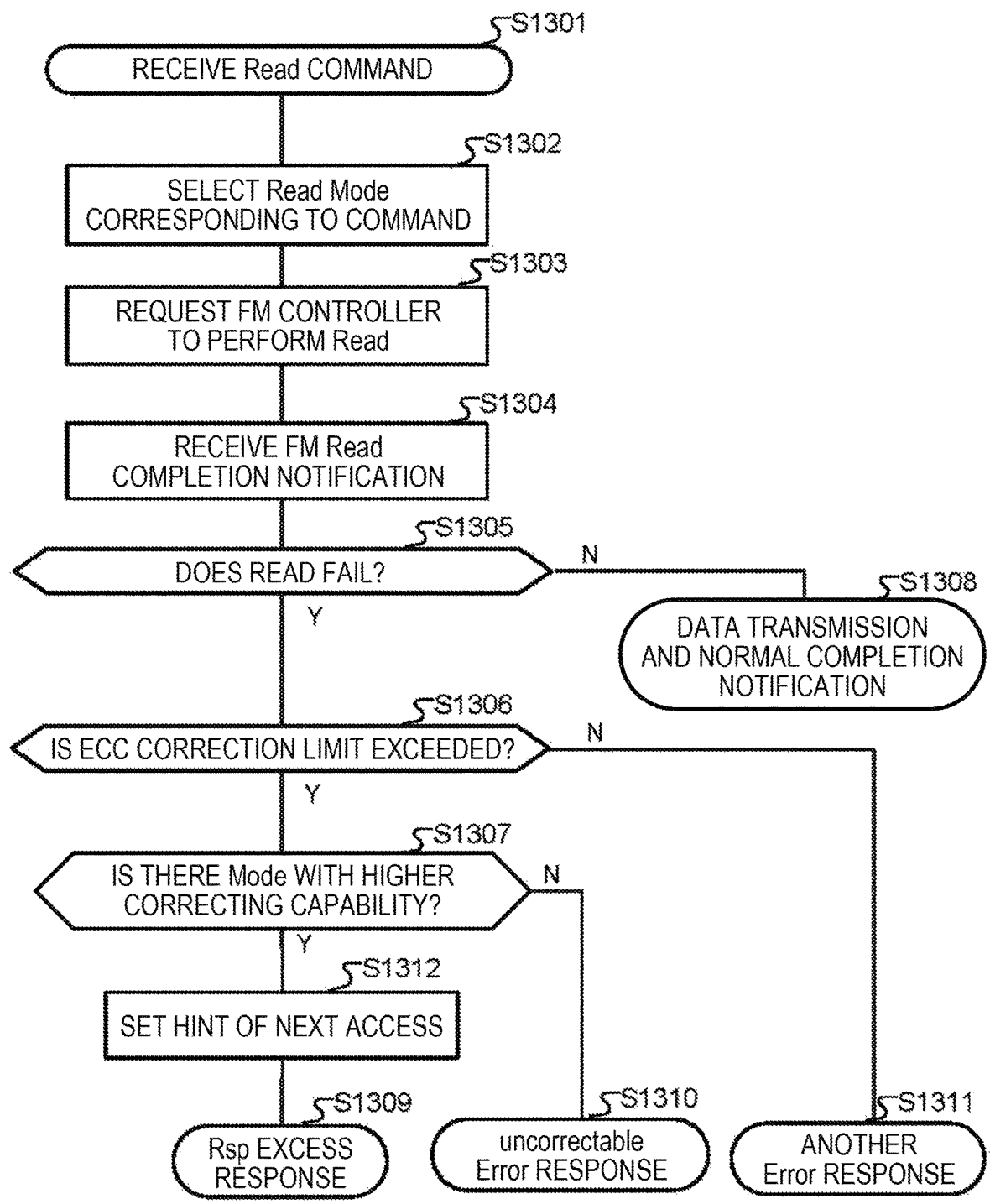
FIG. 13 shows an example of a processing flow of an information storage drive when receiving a read command according to Embodiment 3.

FIG. 13 shows a control flow of the SSD 2 when receiving a read command according to Embodiment 3. A basic processing flow is the same as that of Embodiment 2. Steps S1301 to S1311 correspond to the steps S1001 to S1011 in FIG. 10 of Embodiment 2, respectively. A difference from Embodiment 2 is that a processor 25 according to the present embodiment sets a hint at the time of the next access in the field 1204 of the completion notification 1200 when a response time exceeds a response time request value (Y in S1307) (S1312).

For example, the SSD 2 has a finite number of FMC read modes. The processor 25 can know the mode and a delay time of each of the remaining FMC read modes which are tried. The delay time of each FMC read mode is, for example, predicted in advance or measured and managed by the processor 25. The processor 25 determines a delay time of an FMC read mode with the next highest correcting capability following that of the current FMC read mode, and notifies a storage controller 11 of this information (S1309).

Figure 14:
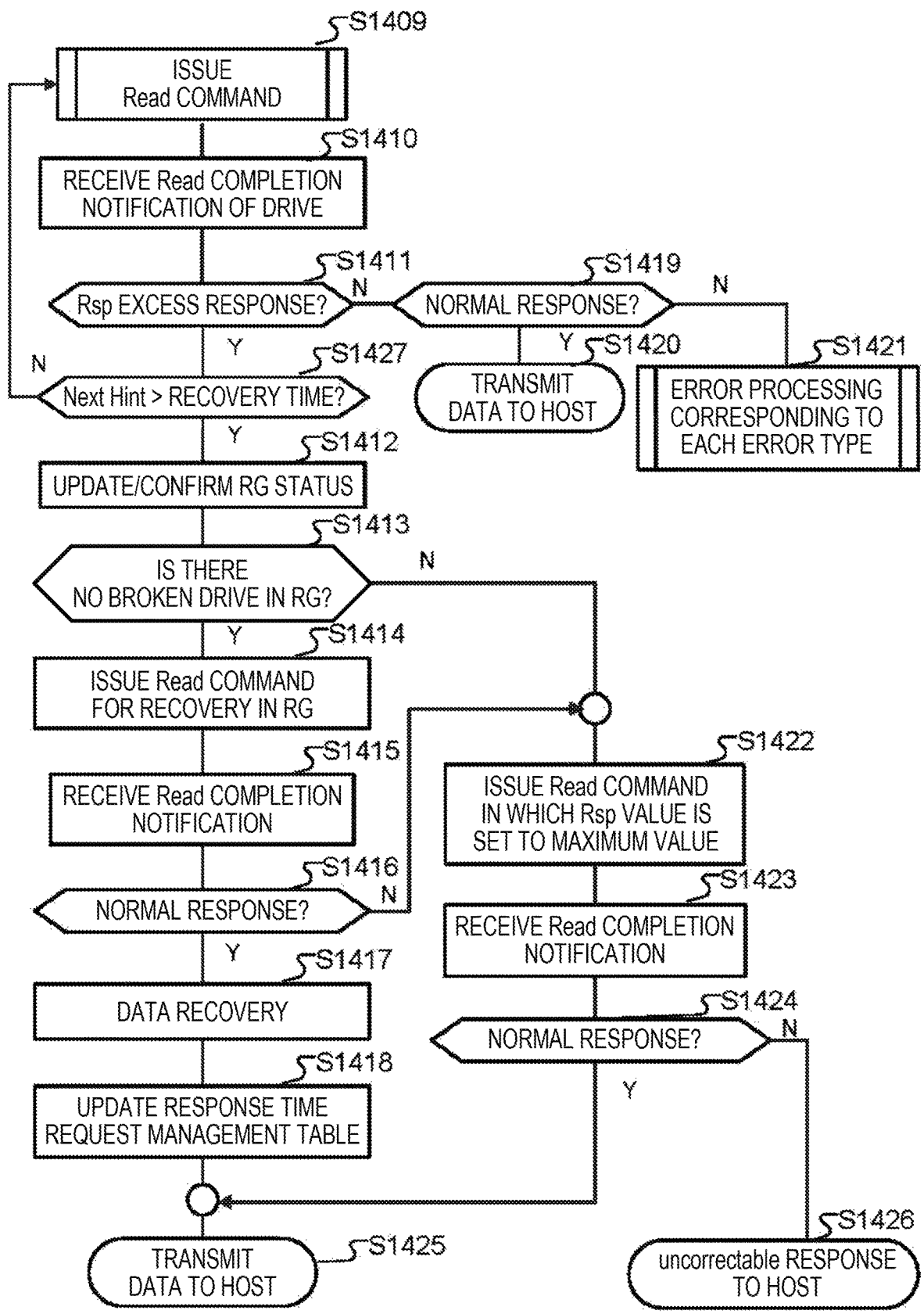
FIG. 14 shows an example of a processing flow of a storage controller when properly and separately using settings of the read command according to Embodiment 3.

FIG. 14 shows a control flow of the storage controller 11 using a read command according to the present embodiment. A basic processing flow is the same as that of Embodiment 2. Steps S1409 to S1426 correspond to the steps S1109 to S1126 in FIG. 11C of Embodiment 2, respectively.

In the present embodiment, the storage controller 11 receives a notification 1200 of an excess of response time request value from the SSD (S1412). The storage controller 11 acquires hint information of a response time at the time of the next access by referring to the field 1204. When the hint information is shorter than a data recovery time using a RAID group (N in S1427), the storage controller 11 reissues a read command to the same SSD 2 (S1409).

As described above, in the present embodiment, the hint information on the delay time at the time of the next access is included in the completion notification from the SSD. The storage controller determines whether to access the same SSD again by using the hint information. In the present embodiment, in addition to the effects of Embodiment 2, the SSD needs to give a response due to the excess of specified response time request value, but it is possible to reduce a delay of data transmission to a host computer 100 when it is predicted that the next read processing is completed within a short time.

It should be noted that the present invention is not limited to the embodiments described above, but includes various modifications. For example, the embodiments described above have been described in detail in order to facilitate understanding of the present invention, and are not necessarily limited to including all the configurations described above. In addition, a part of the configuration of one embodiment can be replaced by the configuration of another embodiment or the configuration of another embodiment can be added to the configuration of one embodiment. Further, it is possible to add, delete, and replace other configurations with respect to a part of the configuration of each embodiment.

In addition, each of the above-described components, functions, processing units, and the like may be implemented by hardware, for example, by designing them as, for example, an integrated circuit. Further, each of the above-described configurations, functions, and the like may be implemented by software by interpreting and executing, by a processor, a program for realizing each function. Information such as programs for realizing each function, tables, files, and the like can be stored in a memory, a recording device such as a hard disk or a solid state drive (SSD), or a storage medium such as an IC card or an SD card.

In addition, a control line or an information line considered to be needed for description is shown, and not all the control lines or information lines of the product are necessarily shown. In practice, it may be considered that almost all the components are mutually connected.

The invention claimed is:

1. A storage apparatus, comprising:
a controller; and
a plurality of redundant arrays of inexpensive disks (RAID) groups each comprising a plurality of storage drives,
wherein the controller issues a read command specifying a value associated with an error correction mode to a first storage drive of the plurality of storage drives included in a RAID group from the plurality of RAID groups,
the first storage drive selects the error correction mode associated with the value specified by the read command from a plurality of error correction modes,
the plurality of error correction modes include a first error correction mode and a second error correction mode with a higher correcting capability and a longer maximum delay time than those of the first error correction mode, and
the first storage drive executes a read of data from a storage medium in the selected error correction mode,
wherein the controller manages an operation status of the RAID group including the first storage drive and determines the value based on the operation status of the RAID group, and
wherein the controller manages the RAID group including the first storage device based on a number of times an uncorrectable error response is received from the RAID group and determines the value based on the number of times the uncorrectable error response is received,
wherein the controller issues the read command specifying a first value corresponding to the first error correction mode when the number of times of the uncorrectable error response is less than or equal to a threshold number and issues the read command specifying a second value corresponding to the second error correction mode when the number of times of the uncorrectable error response is greater than the threshold number.

2. The storage apparatus according to claim 1, wherein the value indicates a type of the read command.

3. The storage apparatus according to claim 1, wherein the value indicates a response delay time for the read command.

4. The storage apparatus according to claim 3, wherein the controller determines the response delay time based on a data length of target data of the read command.

5. The storage apparatus according to claim 1, wherein the controller issues a read command specifying a value associated with the first error correction mode to the first storage drive, and then issues a read command specifying a value associated with the second error correction mode to the first storage drive for target data when recovery of the target data using parity data in the RAID group is not possible.

6. The storage apparatus according to claim 1, wherein the controller generates target data of the read command by using parity data in the RAID group in which the first storage drive is included when receiving a response indicating an uncorrectable error from the first storage drive.

7. The storage apparatus according to claim 1, wherein the first storage drive gives, to the controller, a response indicating an excess of response time when a bit error exceeds a correction limit of the selected error correction mode and an unperformed error correction mode with a higher correcting capability than that of the selected error correction mode exists.

8. The storage apparatus according to claim 1, wherein the first storage drive gives, to the controller, a response indicating an uncorrectable error when a bit error exceeds a correction limit of the selected error correction mode and an unperformed error correction mode with a higher correcting capability than that of the selected error correction mode does not remain.

9. The storage apparatus of claim 1, wherein the first storage drive gives, to the controller, an error response with hint information indicating an estimated delay time in the next read for the read command, and the controller determines whether to reissue a read command to the first storage drive based on the hint information.

10. A storage drive, comprising:
a controller; and
a redundant array of inexpensive disks (RAID) group comprising a storage medium,
wherein the controller receives a read command, from a higher-level device, specifying a value associated with an error correction mode and selects the error correction mode associated with the value specified by the read command from a plurality of error correction modes,
the plurality of error correction modes include a first error correction mode and a second error correction mode with a higher correcting capability and a longer maximum delay time than those in the first error correction mode, and
the storage drive executes a read of data from the storage medium in the selected error correction mode,
wherein the controller gives, to the higher-level device, a response indicating an uncorrectable error, and
wherein the controller receives, from the higher-level device, the value based on a number of times an uncorrectable error is indicated by the controller, wherein the controller receives the read command specifying a first value corresponding to the first error correction mode when the number of times of the uncorrectable error is indicated is less than or equal to a threshold number and issues the read command specifying a second value corresponding to the second error correction mode when the number of times of the uncorrectable error is indicated is greater than the threshold number.

11. The storage drive according to claim 10, wherein the storage medium gives, to the controller, a response indicating an excess of response time when an unperformed error correction mode with a higher correcting capability than that of the selected error correction mode exists, in a correction limit of the selected error correction mode.

12. The storage drive according to claim 10, wherein the controller gives, to the higher-level device, the response indicating an uncorrectable error when an unperformed error correction mode with a higher correcting capability than that of the selected error correction mode does not remain, in a correction limit of the selected error correction mode.

13. The storage drive according to claim 10, wherein the controller gives, to the higher-level device, an error response with hint information indicating an estimated delay time in the next read for the read command.

* * * * *